Dec. 10, 1940. W. F. BOLDT ET AL 2,224,124
BRAKE CONTROL MECHANISM FOR AIRCRAFT
Filed June 6, 1938 2 Sheets-Sheet 1
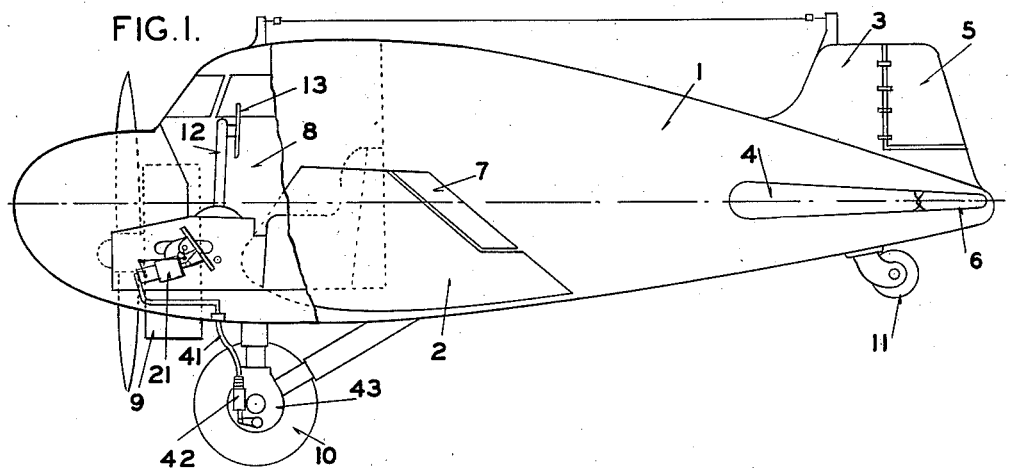
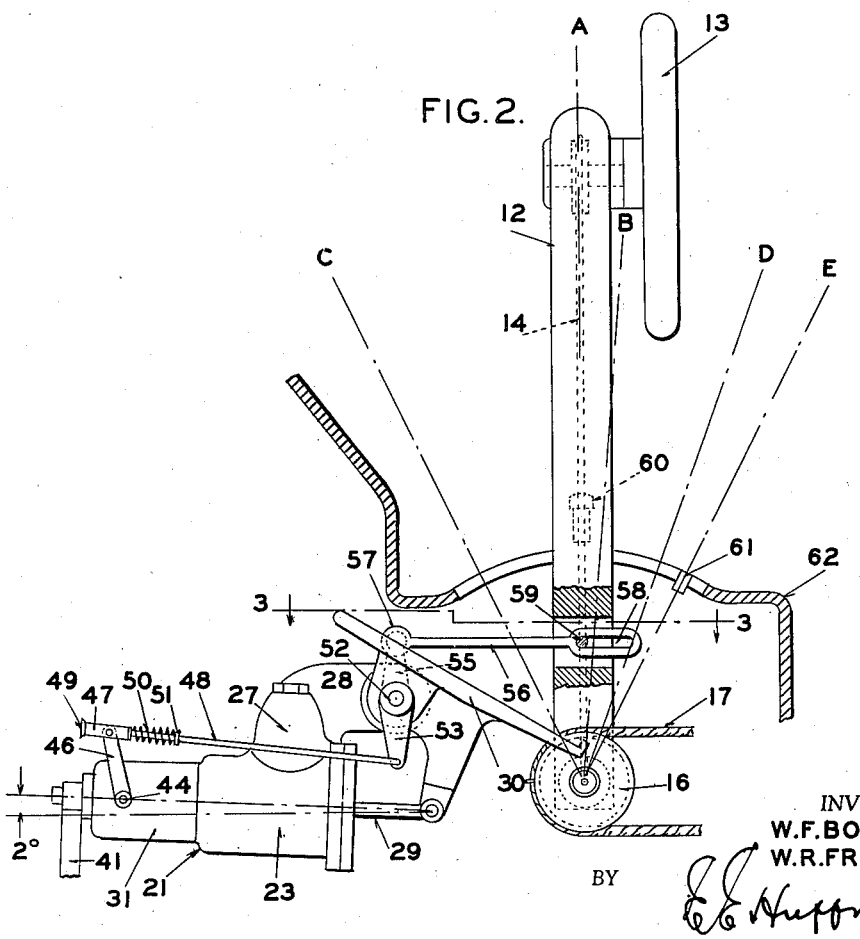
INVENTORS
W. F. BOLDT
W. R. FREEMAN
BY
ATTORNEY.

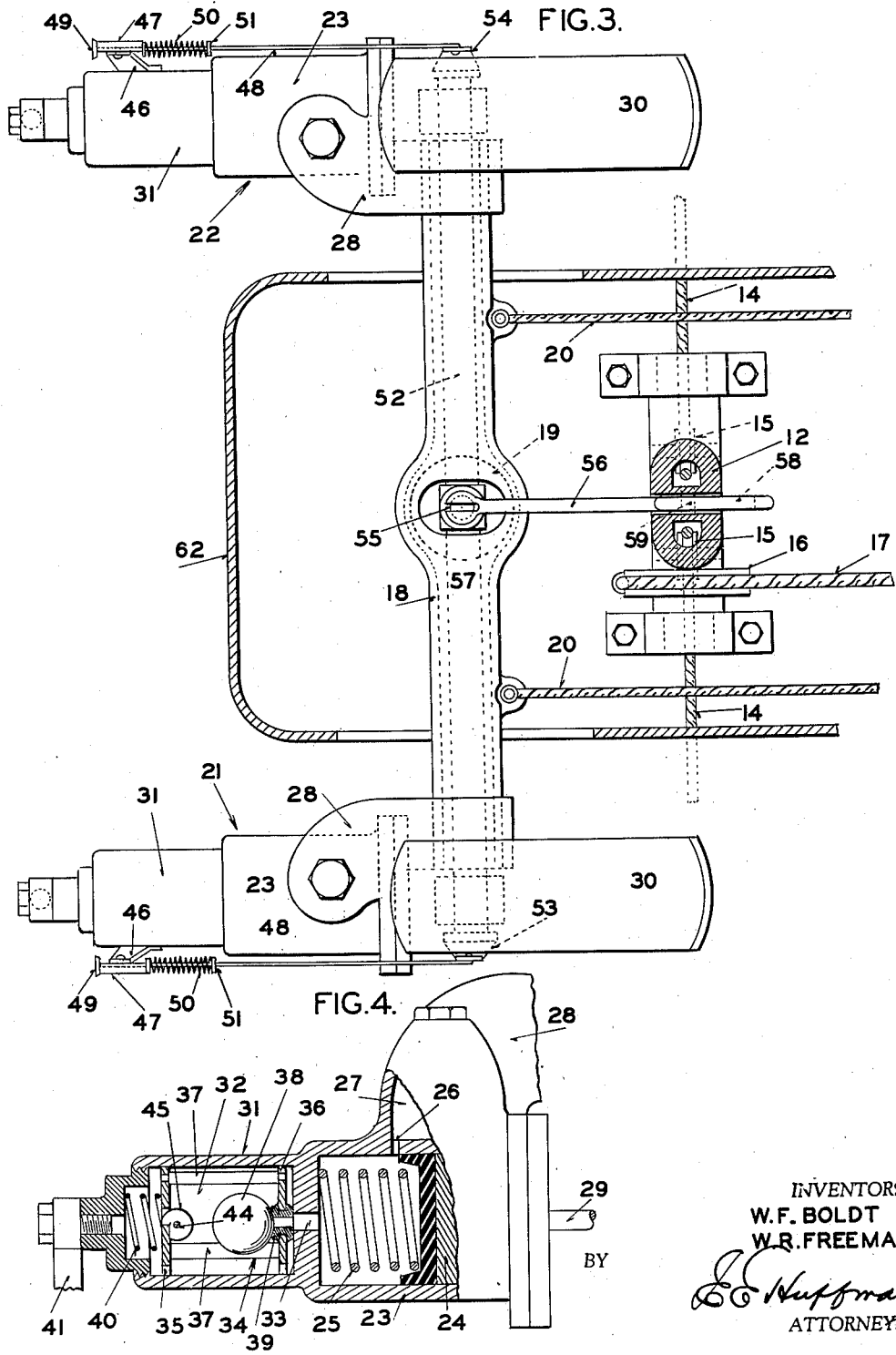

Patented Dec. 10, 1940

2,224,124

UNITED STATES PATENT OFFICE 2,224,124

BRAKE CONTROL MECHANISM FOR AIRCRAFT

Werner F. Boldt, Clayton, and Walter R. Freeman, University City, Mo., assignors to Wagner Electric Corporation, St. Louis, Mo., a corporation of Delaware Application June 6, 1938, Serial No. 211,976

7 Claims. (Cl. 244—111)

Our invention relates to aircraft and more particularly to the control of the braking mechanism for the wheels thereof.

One of the objects of our invention is to provide means for holding the brakes of an aircraft in applied position when the aircraft is on the ground and notwithstanding that the usual brake applying means is permitted by the operator to assume its brake release position.

Another object of our invention is to so construct the brake holding means and associate it with the braking system that it will not be effective when the aircraft is in flight, thus insuring that the brakes will not be held applied at the time of landing.

Still another object of our invention is to so control the brake holding means by a control member employed in operating the aircraft that the holding means will be effective when the control member is in a certain position and ineffective when said member is in another position.

Other objects of our invention will become apparent from the following description taken in connection with the accompanying drawings in which Figure 1 is a side view of an airplane, partly broken away, showing an example of how our brake holding means is embodied in the braking system and associated with the airplane control means; Figure 2 is an enlarged side view of the brake holding means and the airplane control means; Figure 3 is a top view, partly in section, taken on the line 3—3 of Figure 2; and Figure 4 is an enlarged cross-sectional view of a portion of the master cylinder and the brake holding valve mechanism.

Referring to the drawings in detail, the numeral 1 indicates the airplane which is shown as provided with wings 2, a tail fin 3 and stabilizers 4. The fin 3 has associated therewith the rudder 5; the stabilizers have pivoted thereon the elevators 6; and the wings carry the ailerons 7, all of which are employed and may be properly manipulated from the operator's compartment 8 for flying, landing, and "taking off" the airplane. The airplane is powered by the motors and propellers 9, and two landing wheels 10 (one only being shown) and a tail wheel 11 are mounted on the lower part of the airplane for facilitating landing, "taking off" and moving the plane on the ground.

Within the operator's compartment is an upstanding control post 12 pivotally mounted at its base for swinging movement in the longitudinal plane of the airplane. The post has mounted on its top a wheel 13 which operates the cables 14 connected to the ailerons 7, the cables passing down through the post over suitable pulleys 15. The lower end of the post has secured thereto a pulley 16, the axis of which coincides with the pivotal axis of the post, and passing over this pulley and secured thereto is a cable 17 connected in a known manner (not shown) to the elevators 6 on the stabilizers. This construction permits the elevators to be moved down by moving the post forwardly from a neutral position, indicated by the vertical line A (Figure 2) and the elevators to be moved up by movement of the post rearwardly from the neutral position.

Also mounted in the operator's compartment forwardly of the control post is a horizontally positioned rudder control bar 18 which is pivotally mounted at 19 to swing about a vertical axis. The bar has connected thereto on opposite sides of its pivot, cables 20 which operate rudder 5. By this construction, rotation of the bar in one direction from neutral position swings the rudder to one side of the fin and rotation of the bar in the other direction swings the rudder to the other side of the fin.

One end of the rudder bar carries a master cylinder construction 21 for actuating one of the brakes on the landing wheels and the other end of the bar carries a similar master cylinder construction 22 for actuating the other brake on the landing wheels. These master cylinders may be actuated either independently or simultaneously and without movement of the rudder bar. Since the two master cylinder constructions and the braking systems which they control are identical, the same reference characters are employed to indicate the same elements.

The cylinder 23 has reciprocable therein a piston 24 which is biased to its retracter position by a spring 25 and when in this position, the piston uncovers a port 26 for placing the cylinder in communication with the reservoir 27. The cylinder is rigidly secured to the end of the rudder bar by a suitable bracket 28. The piston is actuated by a piston rod 29 connected to the lower end of a pedal or treadle 30 pivotally mounted on the end of the rudder bar.

The forward end of the cylinder carries an integral casing 31 having a chamber 32 communicating with the cylinder by a passage 33. Within the casing 31 is a cage 34 having end plates 35 and 36 and connecting rods 37, the lower two (one only being shown) of which form a track for a ball 38. The end plate 36 carries an annular rubber valve element 39 adapted to be biased by a spring 40 into engagement with the end surface of the chamber surrounding the passage 33. The forward end of casing 31 is connected by a flexible conduit 41 with a fluid motor 42 which operates the brake shoes of the brake assembly 43 associated with the landing wheel.

The casing 31 has projecting therein a shaft 44 carrying a cam 45 which cooperates with end plate 35 for moving the cage against the spring 40 whereby the valve element 39 will be disengaged from the end surface of chamber 32. The exterior end of shaft 44 carries an arm 46 upon the end of which is pivoted a sleeve 47 for slidably receiving an actuating rod 48. One end of the sleeve is engaged by a shoulder 49 on the rod and the other end of the sleeve cooperates with a spring 50 carried by the rod and engaging a shoulder 51. This construction permits the rod to operate the arm and also over-run the arm when the rod is moved more than a predetermined distance.

The rudder bar 18 is of hollow construction and extending therethrough is a shaft 52. The outer end of the shaft adjacent the master cylinder construction 21 has secured thereto an arm 53 to which is connected rod 48. Similarly the outer end of the shaft adjacent the master cylinder construction 22 has secured thereto an arm 54 to which is connected the other rod 48. The center of the shaft at the pivotal axis of the rudder bar carries an arm 55 which extends through an opening at the center of the rudder bar. The upper end of the arm is connected to a rearwardly extending rod 56 by a ball and socket joint 57. The rear end of the rod extends into an opening in the control post 12 and is provided with a slot 58 which receives a pin 59 carried by the post. The post carries a latch 60 for co-operation with a notch 61 in the control mechanism cover 62 whereby the post can be held in its rearmost position.

The master cylinder constructions 21 and 22 are so mounted on the ends of the rudder bar that each of the tracks formed by the two lower rods 37 of the cage is inclined forwardly and upwardly with respect to the plane of the ground when the airplane is on level ground. The angle of inclination is small and may vary under different circumstances but preferably it is about 2 degrees as shown in Figure 2. Thus when the airplane is on level ground each ball 38 will roll to the right end of the cage (Figure 4) and engage the rubber valve element 39 and close the opening therein. If, under these conditions, the valve element is held in engagement with the end of the casing by spring 40, fluid will be prevented from flowing from the brake fluid motor to the master cylinder. If the valve element 39 is held disengaged from the end of the casing by cam 44, then, notwithstanding the fact that the ball engages the valve element, fluid is free to flow to or from the brake fluid motor. The connecting mechanism from the cam operating lever 46 to the post is such that the valve element 39 will be held in engagement with the end of casing 31 when the post is positioned at B slightly rearwardly of its neutral position A. Any movement of the post forwardly of this position B and to a point as far as the position C will cause the cage to be moved to the left against the biasing spring. When the post is moved rearwardly from the position B to the position D, the operating mechanism between the post and the cage will not be actuated due to the slot 58 in rod 56. Movement of the post rearwardly from position D to position E is permitted by spring 50 cooperating with sleeve 47 which receives rod 48. When the post is in position E it may be locked by latch 60, thus insuring that the cage will not be moved from a position where the ball, if engaged with valve element 39, will be effective to prevent return flow of fluid to the master cylinder.

When the airplane is in flight, as shown in Figure 1, the track of the cage will be inclined forwardly and downwardly and under these conditions, gravity will cause the ball to be at the left-hand end of the cage, thus having no effect on the return flow of fluid to the master cylinder.

From the foregoing it is seen that if the airplane is on the ground, the brakes may be applied by actuating the treadles 30. The brakes will be held applied as long as the control post is at the position B or rearwardly thereof. If the pilot desires that they be held applied for any length of time, he may latch the post in position E. If the pilot is alone, this will permit him to work on the plane or to start or "rev" up the motors to test them prior to "taking off" without the necessity of holding his feet on the brake pedals. It is also apparent from the above description that either one of the brakes may be held applied as desired. This may be found desirable in maneuvering the plane on the ground.

When the pilot is ready to "take off," the brakes, if held in applied position by the operation of the ball, may be released by moving the control post forwardly of the position B. There is no danger of the airplane "taking off" with the brakes applied because the elevators are always moved down by a movement of the post forwardly of the neutral position A in order to lift the tail off the ground.

It is also apparent that the brakes cannot be held applied accidentally while the airplane is in flight as the track is so positioned that the ball will be at the left end of the cage. This downward inclination of the track is also maintained when the airplane descends. When the airplane has been landed and is "taxying in," the brakes may be applied and released as desired by the pilot without any danger of the brakes being held applied since, under these conditions, the inertia during deceleration of the airplane maintains the ball at the forward end of the cage and away from valve element 39. Thus it is not necessary to maintain the control post forwardly of the position B to insure that the brake holding means will be ineffective.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. The combination with an airplane provided with pitch control means therefor and with landing wheels, brakes for the wheels and means for actuating the brakes, of means for preventing release of the brakes from applied position, and connecting means between the release preventing means and pitch control means for controlling the operability of the release preventing means by said control means.

2. The combination with an aircraft provided with flying controls for determining the direction of flight and with landing wheels, brakes for the wheels, and means for actuating the brakes, of means for preventing release of the brakes from applied position, and connecting means between the release preventing means and a flying control which functions to cause the brake release preventing means to be inoperative when said flying control is in "take off" position.

3. The combination with an airplane provided with pitch control means therefor and with landing wheels, brakes for the wheels and means for actuating the brakes, of means associated with the actuating means for preventing release of the brakes from applied position, connecting means between the release preventing means and the pitch control means and so governed by said control means when in predetermined positions as to cause said release preventing means to be either effective or ineffective, and means under the control of gravity for causing said release preventing means to be ineffective when the airplane is in substantially horizontal flight or nosing downward notwithstanding the pitch control means is in a position permitting said means to be effective.

4. The combination with an airplane provided with elevators and control means therefor and with landing wheels, brakes for the wheels and means for actuating the brakes, of means for preventing release of the brakes from applied position, and a connection between the brake release preventing means and the control means for the elevators for causing said release preventing means to be ineffective when said control means is placed in a "take-off" position.

5. The combination with an airplane provided with flying controls and with a landing wheel, a fluid-actuated brake for said wheel and a source of fluid pressure connected to actuate the brake, of means for preventing return flow of fluid from the brake to the source of pressure, said means comprising a gravity-controlled valve which is so mounted on the airplane that it will be closed when the airplane is on the ground and open when the airplane is in flight, and means governed by a predetermined position of the flying controls for causing said valve to be ineffective when the airplane is on the ground.

6. The combination with an airplane provided with elevators, control means therefor and with landing wheels, a fluid-actuated brake for each of the wheels, a source of fluid pressure for each brake and independently operable means for actuating each brake from its source of pressure, of a valve means for preventing return flow of fluid from each brake to its source of pressure, each of said valve means comprising a rolling ball which is so mounted on the airplane that it will assume a position causing said valve means to be effective when the airplane is on the ground and a position causing said valve means to be ineffective when the airplane is in flight, and means governed by the control means for the elevators when placed in a "take-off" position for moving said valve means to be ineffective.

7. In an airplane provided with a rudder and with landing wheels, a horizontally positioned rudder control bar adapted to control the rudder by a rotative movement about a vertical axis, fluid-actuated brakes for the wheels, compressors carried by the rudder bar on opposite sides of its vertical axis, conduit means for connecting each compressor with a wheel brake whereby the brakes may be independently operated, a valve means associated with each of the conduits for preventing return flow of fluid from the brake to the compressor, and means for causing both of said valve means to be ineffective and comprising a member movable as a unit with the rudder bar when it is rotated about its vertical axis.

WERNER F. BOLDT.
WALTER R. FREEMAN.